United States Patent

Steinberger et al.

[11] 3,904,145
[45] Sept. 9, 1975

[54] APPARATUS FOR STEPWISE TRANSPORT OF WEBS IN PHOTOGRAPHIC COPYING MACHINES OR THE LIKE

[75] Inventors: Siegfried Steinberger, Munich; Erich Nagel, Anzing; Ernst Biedermann, Munich; Mathias Pflugbeil, Baldham; Karl Dreher; Adolf Fleck, both of Munich, all of Germany

[73] Assignee: Agfa-Gevaert Aktiengesellschaft, Leverkusen, Germany

[22] Filed: May 25, 1973

[21] Appl. No.: 364,080

[30] Foreign Application Priority Data
May 31, 1972  Germany............................ 2226577

[52] U.S. Cl................... 242/75.2; 226/39; 226/195
[51] Int. Cl.²......................................... B65H 23/10
[58] Field of Search.......... 242/75.2, 75.3, 75, 75.5, 242/67.1, 67.2, 67.3, 78.1; 226/55, 39, 195; 242/75.51–75.53, 209

[56] References Cited
UNITED STATES PATENTS
| | | | |
|---|---|---|---|
| 782,909 | 2/1905 | Jefferis | 242/75.2 |
| 3,223,343 | 12/1965 | Commanday et al. | 242/78.1 |
| 3,610,499 | 10/1971 | Gallistel | 226/195 X |

FOREIGN PATENTS OR APPLICATIONS
305,776  2/1929  United Kingdom............... 242/209

*Primary Examiner*—John Petrakes
*Assistant Examiner*—John M. Jillions
*Attorney, Agent, or Firm*—Michael S. Striker

[57] ABSTRACT

Apparatus for transporting webs of photosensitive material in a copying machine has a driven takeup reel which collects exposed material and intermittently driven advancing rolls which withdraw the material from a supply reel in stepwise fashion. A mechanical or electromagnetic friction brake is interposed between the advancing rolls and the takeup reel to abruptly interrupt the transport of material toward the takeup reel, either in response to completed transport of the material by a step or during transport of material by the advancing rolls. The mechanical brake employs an idler roll or a tensioning roll which changes its position in response to changing tension of the material. The electromagnetic brake has an armature which biases the material against a stationary back support in response to energization of the electromagnet which latter is energized when the motor for the takeup reel is idle of vice versa.

20 Claims, 5 Drawing Figures

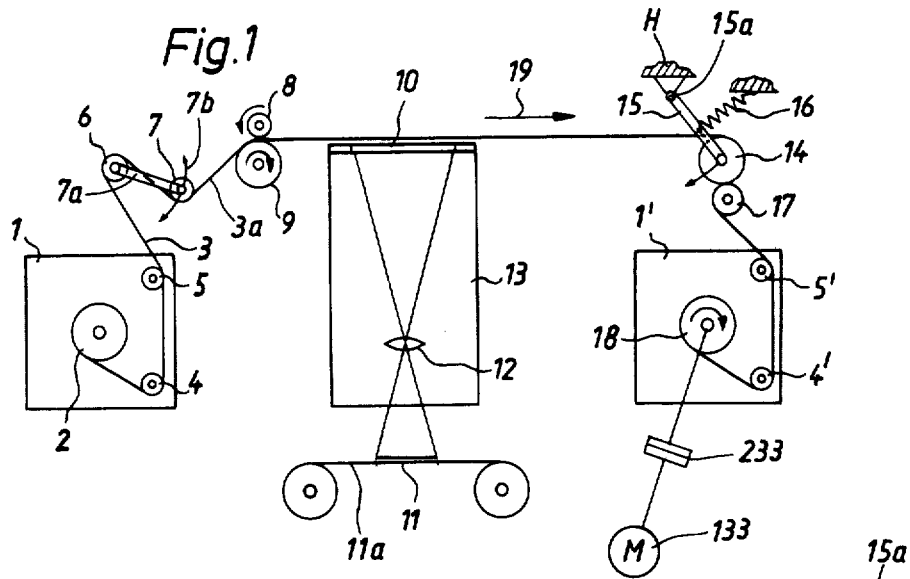
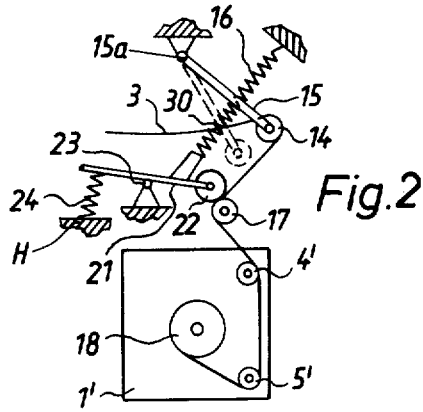
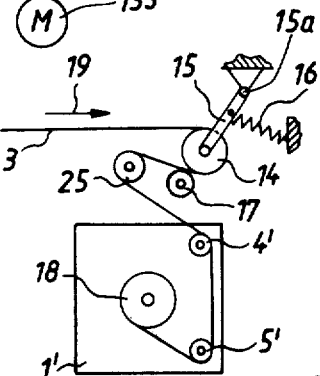
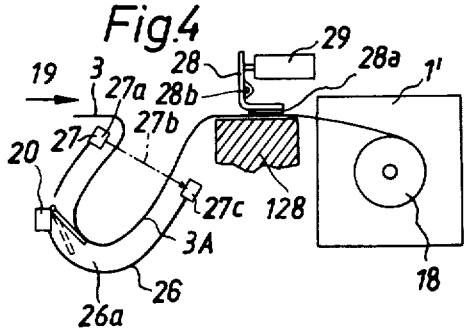
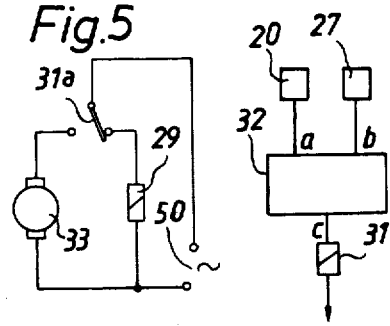

APPARATUS FOR STEPWISE TRANSPORT OF WEBS IN PHOTOGRAPHIC COPYING MACHINES OR THE LIKE

BACKGROUND OF THE INVENTION

The present invention relates to apparatus for intermittently transporting strips or webs of flexible material. More particularly, the invention relates to improvements in apparatus for stepwise transport of webs with a high degree of accuracy such as required, for example, in connection with the transport of webs of photosensitive material in a photographic roll copying machine.

In a roll copying machine, a web of photosensitive material is normally transported past the copying and exposing station by a pair of intermittently driven advancing rolls. The rolls draw the web from a source of supply, e.g., a supply reel in a cassette, and advance the web toward a driven takeup reel which may but need not be confined in a second cassette. A drawback of presently known web advancing apparatus is that, in order to insure tight packing of convolutions on the core of the takeup reel, the latter must be driven with a force which is likely to shift the web lengthwise so that the spacing of exposed areas on the web is non-uniform. If the torque which is being transmitted to the takeup reel is small, the web is likely to from loose convolutions which is undesirable for a number of reasons.

It was already proposed to advance the web between two continuously braked rollers which oppose the web-advancing action of the takeup reel and thereby insure that the neighboring convolutions on the core of the takeup reel are closely adjacent to each other. Such braking rollers are satisfactory only if the braking moment is selected and maintained with a very high degree of precision which, in turn, presents serious problems because the pull which the takeup reel exerts upon the web varies as a function of the changing diameter of convoluted material on the takeup reel. The situation is further aggravated when the web is being transported at a high frequency, at an elevated speed, and when the source contains a considerable length of web so that the difference between the maximum and minimum diameters of convoluted material on the take-up reel is very pronounced. All or nearly all recent types of photographic roll copying machines are designed with a view to receive and process substantial lengths of web-like photosensitive material.

SUMMARY OF THE INVENTION

An object of the invention is to provide a novel and improved apparatus for intermittent transport of webs or strips which can insure a highly satisfactory winding of webs on the core of a takeup reel without relying on a continuous braking action upon the web.

Another object of the invention is to provide a web transporting apparatus which is capable of advancing the web by increments of identical length irrespective of the overall length of the web and/or the diameter of convoluted material on the takeup reel.

A further object of the invention is to provide a web transporting apparatus which can be built into existing photographic roll copying or like machines as a superior substitute for conventional apparatus, which comprises a small number of relatively simple parts, and whose space requirements do not exceed those of conventional apparatus.

An additional object of the invention is to provide the improved apparatus with novel and improved web braking and collecting means.

The invention is embodied in an apparatus for stepwise transport of elongated webs or strips, particularly in a photographic roll copying machine. The apparatus comprises a source of web material (e.g., a supply reel mounted in the interior of a first cassette), rotary takeup means for collecting the web material (such takeup means may comprise a continuously or intermittently driven takeup reel in a second cassette), advancing means which is actuatable to transport the web material stepwise along a predetermined path from the source to the takeup means, and a friction brake which is adjacent to the path and is operable to intermittently brake the web material intermediate the advancing means and the takeup means.

The friction brake may be actuated by the web material, e.g., by being responsive to changing tension of the material or by being responsive to changes in the length of a supply of such material which is being accumulated between the advancing means and takeup means. The apparatus may employ a mechanical friction brake or a friction brake wherein a movable braking member constitutes the armature of an electromagnet.

The novel features which are considered as characteristic of the invention are set forth in particular in the appended claims. The improved web transporting apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic elevational view of a photographic roll copying machine including a web transporting apparatus which embodies one form of the invention;

FIG. 2 is a fragmentary elevational view of a transporting apparatus which employs a second friction brake;

FIG. 3 is a fragmentary elevational view of a transporting apparatus which employs a third friction brake;

FIG. 4 is a fragmentary elevational and partly sectional view of a transporting apparatus which employs an electromagnetic friction brake; and FIG. 5 is a diagram of the electric circuit in the machine which embodies the transporting apparatus of FIG. 4.

DESCRIPTION OF THE PREFERRED EMBODIMENTS

Referring first to FIG. 1, there is shown a portion of a photographic roll copying machine which images successive originals 11 onto a strip or web 3 of photosensitive material. The source of web 3 is a reel 2 in the interior of a supply cassette 1 which further contains guide rolls 4 and 5. The web passes through a suitable outlet or mouth of the supply cassette 1 and is trained over a further guide roll 6 and thereupon over a dancer roll or damping roll 7 mounted on a pivotable lever 7a. The dancer roll 7 can move in directions indicated by a double-headed arrow 7b; it pivots counterclockwise when the web 3 is being transported lengthwise by two advancing rolls 8, 9, and it pivots clockwise when the advancing rolls 8, 9 are at a standstill.

The advancing rolls 8, 9 (at least one of which is actuatable at regular or irregular intervals so as to rotate in the direction indicated by arrow) are followed by a copying or exposing station 10 where the images of originals 11 are projected onto the photosensitive layer at the underside of the web 3. The copying station 10 further accommodates a suitable light source (not shown), an objective lens system 12, and a light duct 13 which prevents the light furnished by the source from straying in the region between the support 11a (e.g., a conveyor) for originals 11 and the path for the web 3. The direction in which the web 3 advances stepwise in response to intermittent rotation of the advancing rolls 8, 9 is indicated by an arrow 19. If desired, the advancing rolls 8, 9 may be mounted downstream of the copying station 10.

The exposed part of the web 3 is collected by and stored in a takeup cassette 1' which is preferably (but not necessarily) identical with the supply cassette 1. The supply of exposed web forms in the interior of the cassette 1' a number of closely adjacent convolutions surrounding the core of a driven takeup reel 18. The diameter of convoluted web material on the reel 18 grows in response to repeated transport of unit lengths of the web 3 in the direction indicated by the arrow 19. The cassette 1' contains two guide rolls numbered 4' and 5'.

In accordance with a feature of the invention, the web transporting apparatus of FIG. 1 further comprises a friction brake which insures a satisfactory tensioning of that portion of the web 3 which surrounds the core of the takeup reel 18 in the interior of the cassette 1'. The friction brake further prevents clockspringing of the web in the cassette 1' by cooperating with a continuously driven electric motor 133 and a friction clutch 233 to oppose the unwinding of web material from the reel 18 when the advancing rolls 8, 9 are idle.

The improved friction brake comprises a detector which monitors the tension of the web 3 between the copying station 10 and the takeup cassette 1'. The detector comprises a movable braking member here shown as an idler roll 14 which is pivotable with a lever 15. The latter is turnable about the axis of a shaft 15a mounted in the housing or frame H of the copying machine. A helical spring 16 is provided to permanently bias the lever 15 in a counterclockwise direction, as viewed in FIG. 1. The movable braking member or idler roll 14 can cooperate with a fixedly mounted non-rotatable braking member or cylinder 17 which has a peripheral surface provided on a material having a high coefficient of friction. The web 3 contacts the peripheral surface of the cylinder 17 along an arc of at least 60° and preferably along an arc of about 90°.

The mounting of the lever 15 is such that, when the peripheral surface of the idler roll 14 moves nearest to the peripheral surface of the cylinder 17 (i.e., when the web 3 is pinched in the nip of the parts 14 and 17), the line connecting the axis of the shaft 15a with the axis of the idler roll 14 makes a large obtuse angle with the line connecting the axes of the roll and cylinder 17. This obtuse angle is preferably slightly less than 180° so that, when the web 3 is being pulled by the motor 133 into the interior of the takeup cassette 1', the tension of the web tends to urge the idler roll 14 toward the fixed cylinder 17 in a manner resembling the action of a toggle mechanism. The aforementioned angle decreases when the idler roll 14 is free to move away from the cylinder under the action of the spring 16.

The operation:

The conveyor 11a places successive originals 11 into register with the optical system 12 at regular or irregular interval, preferably at a high frequency. The image of each original 11 is exposed onto a different portion of the intermittently transported web 3, namely, onto that portion which is located at the copying station 10. The advancing rolls 8, 9 are driven upon completion of each exposure and push the web 3 in a direction indicated by the arrow 19 whereby the thus pushed length of the web 3 advances toward the friction brake including the parts 14, 15, 15a, 16 and 17. The length of each portion of the web 3 which advances lengthwise (arrow 19) in response to rotation of the advancing rolls 8, 9 corresponds to the length of a print. The dancer roll 7 rises during rotation of the advancing rolls 8, 9 so that the length of the loop 3a between the advancing rolls 8, 9 and the guide roll 6 decreases. When the advancing rolls 8, 9 come to a halt, the dancer roll 7 descends by gravity (and/or under the action of suitable biasing means) to thereby draw an appropriate length of the web 3 from the supply reel 2 in the cassette 1.

The lever 15 pivots in a counterclockwise direction while the advancing rolls 8, 9, push the web 3 in the direction indicated by the arrow 19, i.e., the spring 16 is then free to contract and to move the idler roll 14 upwardly and away from the fixed cylinder 17. Therefore, the web 3 can slide along the stationary peripheral surface of the cylinder 17 (while the idler roll 14 is raised) under the action of the continuously driven motor 133 which rotates the takeup reel 18 clockwise by way of the friction clutch 233. The friction clutch 233 is adjusted in such a way that it allows the motor 133 to rotate relative to the takeup reel 18 as soon as the reel 18 offers predetermined (relatively low) resistance to further rotation in a clockwise direction.

When the advancing rolls 8, 9 come to a standstill, the lever 15 pivots clockwise in response to increasing tension of the web 3 so that its peripheral surface presses the adjacent portion of the web against the peripheral surface of the stationary cylinder 17. This results in an abrupt stoppage of the web 3 due to the high friction coefficient of the material along the periphery of the cylinder 17 as well as a result of the aforementioned toggle action of the friction brake. The inertia of the takeup reel 18 suffices to tension the web 3 in the region downstream of the cylinder 17 so that the reel 18 collects tightly packed convolutions of the web. It has been found that the inertia of the takeup reel 18 suffices to insure a substantial tensioning of the web 3 as soon as the friction brake becomes effective so that the convolutions on the core of the reel 18 are closely adjacent to each other. The clockspringing of convoluted material is prevented by the friction brake in cooperation with the motor 133 and friction clutch 233. Since the inertia of the takeup reel 18 increases with the diameter of convoluted web material thereon, the winding of web 3 in the takeup cassette 1' remains uniform irrespective of the length of web material which forms the roll on the real 18, i.e., the web 3 is taut and the real 18 can store a substantial length of convoluted material because all convolutions are immediately adjacent to the neighboring convolutions.

FIG. 2 illlustrates a modified friction brake which employs the fixed (non-rotatable) braking member or cylinder 17, the detector or idler roll 14 which constitutes a web tensioning device, the spring 16, the shaft 15a and lever 15, as well as a two-armed lever 21 fulcrumed in the housing H at 23 and carrying an idler roller 22 which constitutes a movable braking member and can press the web 3 against the friction generating material along the periphery of the cylinder 17. The roller 22 is mounted on one arm of the lever 21 and the other arm of this lever is biased counterclockwise by a helical spring 24. A further helical spring 30 reacts against the lever 15 and bears against the right-hand arm of the lever 21. Thus, the lever 21 will pivot clockwise in response to a clockwise pivoting of the lever 15 as a result of increased tension of the web 3 in the region of the idler roll 14.

The relationship of the axes of the fulcrum 23, roller 22 and cylinder 17 is similar to that described in connection with FIG. 1 for the axes of the parts 15a, 14 and 17, i.e., a toggle action develops when the spring 30 biases the lever 21 clockwise whereby the web 3 is abruptly clamped between the braking member 17 and 22 to come to an immediate stop as soon as the roller 22 begins to urge the adjacent portion of the web against the peripheral surface of the cylinder 17. That position of the lever 15 in which the bias of the spring 30 suffices to prevent further movement of the web 3 relative to the cylinder 17 is indicated by broken lines. The idler roll 14 insures that the web portion between the advancing rolls 8, 9 (not shown in FIG. 2) and the roller 22 is subjected to at least some tensional stresses. Otherwise, the construction of the web transporting apparatus embodying the structure of FIG. 2 corresponds to that of the first transporting apparatus. Thus, the illustrated takeup cassette 1' is identical with that of the supply cassette 1 (not shown in FIG. 2), and the advancing rolls 8, 9 can be mounted upstream or downstream of the copying station.

FIG. 3 illustrates a third friction brake which includes the parts 14, 15, 15a, 16, 17 of FIG. 1 and an auxiliary idler roller 25 which maintains the web 3 out of contact with the peripheral surface of the cylinder 17 when the spring 16 is free to contract so as to reduce the angle between the line connecting the axes of 15a, 14 and the line connecting the axes of 14, 17. An advantage of this friction brake is that the web 3 is treated gently because it is moved (by the idler roll 14) into contact with the friction generating material of the cylinder 17 only in the course of the application of a braking force, i.e., only when the advancing rolls 8, 9 (not shown in FIG. 3) are at a standstill so that the inertia of the takeup reel 18 in the cassette 1' tensions the web 3 between 8, 9 and 25 and thereby expands the spring 16 so that the lever 15 pivots clockwise and the idler roll 14 presses the web against the cylinder 17.

FIG. 4 illustrates a further embodiment of the invention wherein a friction brake including a stationary braking member or back support 128 and an electromagnet 29 is applied and disengaged in response to changes in the length of a loop 3A formed by the web 3 upstream of the braking station. The web is fed lengthwise (arrow 19) by the advancing rolls 8, 9 (not shown in FIG. 4) and is collected in the cassette 1' (see the takeup reel 18). An arcuate holder or magazine 26 defines a loop forming chamber 26a and supports a first scanning device in the form of an electric switch 20 which is arranged to close as soon as the loop 3A reaches a predetermined maximum length, i.e., as soon as the chamber 26a receives a predetermined maximum quantity of web material. A second scanning device 27 (see also FIG. 5) serves to produce a signal when the length of the loop 3A is reduced to a predetermined minimum value, i.e., when the chamber 26a contains a predetermined minimum quantity of web material. This second scanning device is a photoelectric detector having a light source 27a which directs a beam 27b of light against a photosensitive receiver 27c. The length of the loop 3A reaches its minimum value when the beam 27b impinges upon the element 27c. If the web 3 is coated with a layer of photosensitive material, the source 27a preferably emits light in the non-actinic region of the spectrum.

The electromagnet 29 has an armature 28 constituting the movable member of the friction brake and provided with a brake lining or friction pad 28a adapted to press the adjacent portion of the web 3 against the back support 128 when the electromagnet 29 is energized. The armature 28 is pivotable at 28b. The top surface of the back support 128 is preferably smooth.

The electric circuit of the copying machine embodying the structure of FIG. 4 is shown in FIG. 5. The motor 33, which serves to intermittently rotate the takeup reel 18 in the cassette 1' of FIG. 4, is connected in series with an energy source 50 and in parallel with the electromagnet 29. The circuit of the motor 33 or electromagnet 29 can be completed or opened by the switch 31a of a relay 31 which is controlled by the scanning devices 20, 27 by way of a flip-flop 32. When the relay 31 is deenergized, the switch 31a assumes the illustrated position in which the electromagnet 29 is energized so that the friction pad 28b biases the adjacent portion of the web 3 against the top surface of the back support 128.

The scanning devices 20 and 27 respectively transmit electric signals to the first and second inputs $a$ and $b$ of the flip-flop 32. The signal from the output $c$ of the flip-flop 32 energizes the relay 31 to complete the circuit of the motor 33 when the input $a$ receives a signal from the scanning device 20. The signal from the scanning device 27 to the input $b$ erases the signal at the output $c$ whereby the switch 31a completes the circuit of the electromagnet 29 and opens the circuit of the motor 33.

The parts 20, 27, 31, 32 together constitute a control unit for the friction brake 29, 128. The control unit includes at least one scanning device (20 or 27) which produces signals when the quantity of web material in the magazine 26 reaches a predetermined value and means 31, 32 for operating the friction brake in response to such signals.

The operation of the web transporting apparatus embodying the structure of FIGS. 4 and 5 is as follows:

When the advancing rolls 8, 9 (not shown) rotate in a direction to transport the web 3 lengthwise (arrow 19), the length of the supply or loop 3A in the chamber 26a of the magazine or holder 26 for the scanning devices 20, 27 increases. When the length of the loop 3A reaches or approximates the illustrated length, the loop 3A causes the scanning device 20 to transmit a signal to the input $a$ of the flip-flop 32 so that the output $c$ of the flip-flop transmits a signal which energizes the relay 31. The switch 31a then assumes its second position to thereby open the circuit of the electromagnet 29 and to simultaneously complete the circuit of the motor 33. The deenergized electromagnet 29 retracts its armature 28 (i.e., the armature pivots counterclockwise, as viewed in FIG. 4) so that the pad 28a ceases to press the web against the back support 128. Since the motor 33 drives the takeup reel 18 in the cassette 1', the web 3 is being drawn through the gap between the parts 28a, 128 and is being collected by the reel 18. The length of the loop 3A decreases and the scanning device 27 transmits a signal to the input b of the flip flop 32 as soon as the length of the loop reaches its minimum value. The signal at the input b erases the signal at the output c of the flip-flop 32 so that the relay 31 returns the switch 31a to the position shown in FIG. 5 and the circuit of the motor 33 is open while the switch 31a simultaneously completes the circuit of the electromagnet 29. The latter pivots the armature 28 in a clockwise direction, as viewed in FIG. 4, so that the pad 28a presses the adjacent portion of the web 3 against the top surface of the back support 128 with the result that the forward movement of the web 3 is terminated practically instantaneously. However, the takeup reel 18 continues to rotate clockwise due to inertia and insures that the convolutions of the roll of web material thereon are tightly packed in the interior of the cassette 1'.

The tensioning of the web 3 during rotation of the reel 18 with the motor 33 is rather minimal because the friction brake including the electromagnet 29 and back support 128 is idle. Therefore, the reel 18 collects loose convolutions of web 3 whenever the motor 33 receives electrical energy and rotates the reel 18. However, when the friction brake is applied, i.e., when the motor 33 is arrested and the electromagnet 29 is energized, the inertia of the reel 18 suffices to reduce the diameters of the outermost convolutions of web 3 in the cassette 1' so that such convolutions are tightly packed before the advancing rolls 8, 9 again increase the length of the loop 3A to a value which is needed to effect the transmission of a signal from the scanning device 20 to the input a of the flip-flop 32. The inertia of the reel 18 is assisted by inertia of the motor 33 (whose rotor tends to rotate after the switch 31a reassumes the position shown in FIG. 5). The combined inertia of the motor 33 and reel 18 is amply sufficient to insure a desirable reduction of the length of outer-most convolutions on the reel 18. The friction brake 29, 128 remains operative while the size of the loop 3A grows from the aforementioned minimum value to that shown in FIG. 4. The brake is then disengaged and the motor 33 is started to insure that the web 3 will be drawn into the cassette 1' as long as the scanning device 27 remains ineffective, i.e., as long as the loop 3A prevents the light beam 27b from reaching the photosensitive element 27c. The core of the reel 18 may be of the type which can rotate in a single (clockwise) direction whereby such core cooperates with the brake 29, 128 to prevent any clockspringing of the web in the cassette 1' while the motor 33 is idle and the friction brake is engaged to enable the advancing rolls 8, 9 to build a fresh loop 3A.

The apparatus of FIGS. 4-5 exhibits the advantage that the length of the loop 3A can be changed and/or adjusted at will and with a high degree of accuracy, for example, by changing the position of the scanning device 20 relative to the scanning device 27 or vice versa.

It has been found that the pull which is exerted upon the web 3 by the takeup reel 18 after the circuit of the motor 33 is interrupted is normally much greater than the pull which is exerted by the motor 133 through the intermediary of the friction clutch 233. The inertia of the takeup reel 18 suffices to insure the formation of tightly packed convolutions not later than when the web forms two convolutions on the core of the takeup reel. The inertia increases with the diameter of convoluted material in the cassette 1', i.e., the tightening of convolutions in the cassette 1' improves as the diameter of convoluted material increases.

The apparatus of FIGS. 4-5 can be modified in a number of ways. For example, the scanning device 27 can be replaced with a simple time-delay device which deenergizes the electromagnet 31 with a predetermined delay following the transmission of a signal from the scanning device 20 to the input a of the flip-flop 32. The time-delay device is then adjusted in such a way that it energizes the electromagnet 29 and simultaneously opens the circuit of the motor 33 with a predetermined delay following the energization of relay 31 by a signal from the output of the scanning device 20. Such delay is selected with a view to insure that, at a given speed of the motor 33, the cassette 1' receives a given length of web 3 before the friction brake is applied in response to deenergization of the relay 31.

As mentioned before, the advancing rolls 8, 9 may be mounted upstream or downstream of the copying station 10. Also, the signal from the scanning device 20 may be used to deenergize the electromagnet 29 whereby the switch 31a moves to the position shown in FIG. 5 in response to a signal from the scanning device 27 which causes the electromagnet to become energized in response to energization of the relay 31. The electromagnet 29 can be constructed and mounted in such a way that it must be deenergized in order to move the friction pad 28a toward the top surface of the back support 128.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. Apparatus for tightly packing the convolutions of elongated web material, comprising a source of web material, said web material having a leader; rotary takeup means connected with said leader; means for rotating said takeup means in a direction to collect and convolute the web material on said takeup means; advancing means actuatable to transport the web material stepwise along a predetermined path extending from said source to said takeup means; a friction brake for braking the web material intermediate said advancing means and said takeup means in response to an interruption of actuation of said advancing means while said takeup means continues to rotate in said direction whereby said takeup means packs the convoluted web material as a result of further rotation of said takeup means in said direction upon application of said brake, said brake comprising first and second braking members disposed at the opposite sides of said path; means for looping the web material intermediate said advancing means and said brake during actuation of said advancing means; and means for applying said brake in response to a reduction of the length of looped web material as a result of collection of web material by said takeup means following an interruption of actuation of said advancing means, including a device for moving one of said braking members toward the other of said braking members to thereby bias the web material against said other braking member in response to said reduction of the length of looped web material.

2. Apparatus as defined in claim 1, wherein said first braking member has a surface with a high coefficient of friction which engages the web material at least in response to movement of said one braking member toward said other braking member.

3. Apparatus as defined in claim 2, wherein said other braking member is a fixed cylinder and said surface is the peripheral surface of said cylinder.

4. Apparatus as defined in claim 3 wherein the web material contacts the periphery of said cylinder along an arc of at least 60 degrees.

5. Apparatus as defined in claim 5, wherein said one braking member is an idler roll and said looping means comprises a second roll engaging the web material intermediate said idler roll and said advancing means and means for yieldably urging said second roll in direction to loop the web material about said second roll ahead of said idler roll and to simultaneously urge said idler roll away from said cylinder through the medium of said web material, said device comprising means for biasing said idler roll toward said cylinder with a force which suffices to apply said brake in response to said reduction of the length of looped web material.

6. Apparatus as defined in claim 1, wherein said looping means comprises a tensioning element engaging the web material intermediate said braking members and said advancing means, said tensioning element being movable by web material in a predetermined direction in response to rotation of said takeup means between successive actuations of said advancing means and said device comprising means for biasing said one braking member toward said other braking member in response to movement of said tensioning element in said last mentioned direction.

7. Apparatus as defined in claim 1, wherein said looping means comprises a magazine for the storage of a supply of web material intermediate said advancing means and said brake, said device including a scanning element for monitoring the quantity of the material in said supply and for producing signals in response to detection of a predetermined quantity, and means for applying said brake in response to said signals.

8. Apparatus as defined in claim 7, wherein said scanning element includes a photosensitive detector comprising a source of non-actinic light.

9. Apparatus as defined in claim 8, wherein said device comprises an electromagnet having a movable armature which constitutes said one braking member.

10. Apparatus as defined in claim 9, wherein said armature moves toward said other braking member in response to energization of said electromagnet and said means for rotating said takeup means comprises an electric motor, said device further comprising control means for alternately energizing said electromagnet and starting said motor so that said armature biases said web material against said other braking member while said motor is idle and vice versa.

11. Apparatus as defined in claim 6, wherein said looping means comprises a magazine for storage of a supply of web material intermediate said brake and said advancing means and said device further comprises a scanning element for monitoring the quantity of web material in said supply and for producing signals in response to detection of a predetermined minimum quantity, said control means being responsive to said signals to thereby energize said electromagnet.

12. Apparatus as defined in claim 3, wherein said looping means comprises a magazine for storage of a supply of web material intermediate said brake and said advancing means and said device further comprises a scanning element for monitoring the quantity of web material of said supply and for producing signals in response to detection of a predetermined maximum quantity, said control means being responsive to said signals to thereby deenergize said electromagnet.

13. Apparatus as defined in claim 10 wherein said control means comprises a flip-flop.

14. Apparatus for tightly packing the convolutions of elongated web material, comprising a source of web material, said web material having a leader; rotary takeup means connected with said leader; means for rotating said takeup means in a direction to collect and convolute the web material on said takeup means; advancing means actuatable to transport the web material stepwise along a predetermined path extending from said source to said takeup means; a friction brake for braking the web material intermediate said advancing means and said takeup means in response to an interruption of actuation of said advancing means while said takeup means continues to rotate in said direction whereby said takeup means packs the convoluted web material as a result of further rotation of said takeup means in said direction upon application of said brake, said brake comprising first and second braking members disposed at the opposite sides of said path, one of said braking members being movable toward and away from the other of said braking members to thereby bias the web material against said other braking member in response to movement of said one braking member toward said other braking member, the web material being trained over said one braking member; and means for looping the web material, including means for yieldably biasing said one braking member away from said other braking member, said one braking member being moved by the web material toward said other braking member in response to continued rotation of said takeup means following an interruption of actuation of said advancing means whereby the web material overcomes the resistance of said biasing means.

15. Apparatus as defined in claim 14, wherein said first braking member has a surface with a high coefficient of friction which engages the web material at least in response to movement of said one braking member toward said other braking member.

16. Apparatus as defined in claim 15, wherein said other braking member is a fixed cylinder and said surface is the peripheral surface of said cylinder.

17. Apparatus as defined in claim 16, wherein said one braking member is an idler roll.

18. Apparatus as defined in claim 15, wherein the web material contacts said cylinder along an arc of at least 60°.

19. Apparatus as defined in claim 14, wherein said other braking member is a cylinder and said one braking member is a roll, said looping means further comprising a lever pivotable about a predetermined axis and supporting said roll, said biasing means being arranged to pivot said lever in a first dirction to move said roll away from said cylinder and said lever pivoting in a second direction to move said roll toward said cylinder when the tension of web material increases as a result of rotation of said takeup means following an interruption of actutation of said advancing means, the axes of said cylinder and said roll being parallel to said predetermined axis and the axis of said roll approaching the line which connects the axis of said cylinder with said predetermined axis when said lever is pivoted against the opposition of said biasing means so that said roll presses the web material against said cylinder with a substantial force as soon as the roll moves sufficiently close to said cylinder to bear against a portion of web material which is simultaneously in contact with said cylinder.

20. Apparatus as defined in claim 14, further comprising a roller located between said brake and said takeup means, the web material being trained over said roller and contacting said other braking member only in response to movement of said one braking member toward said other braking member.

* * * * *